March 13, 1928.

J. B. VERNAY 1,662,726

FILTERING APPARATUS

Filed Feb. 16, 1927

Inventor:
Jean Baptiste Vernay
By
Attorney

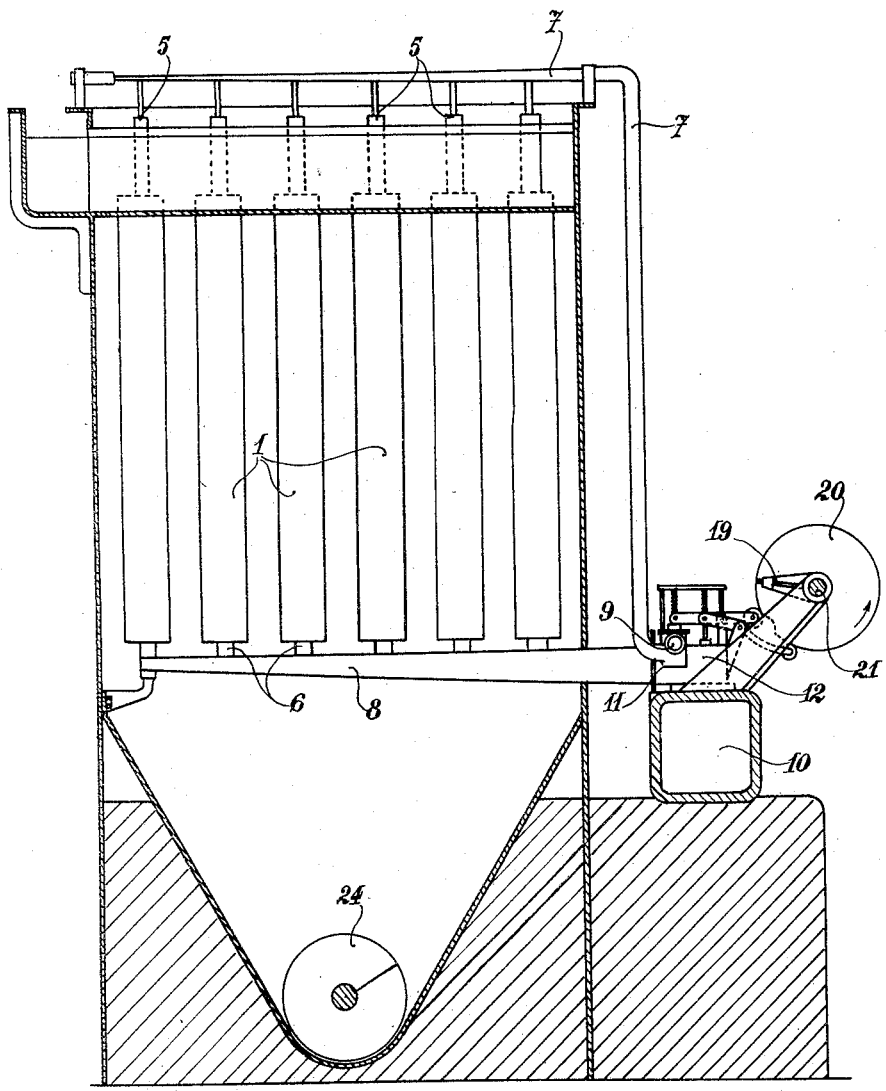

March 13, 1928.
J. B. VERNAY
1,662,726
FILTERING APPARATUS
Filed Feb. 16 1927　　4 Sheets-Sheet 3
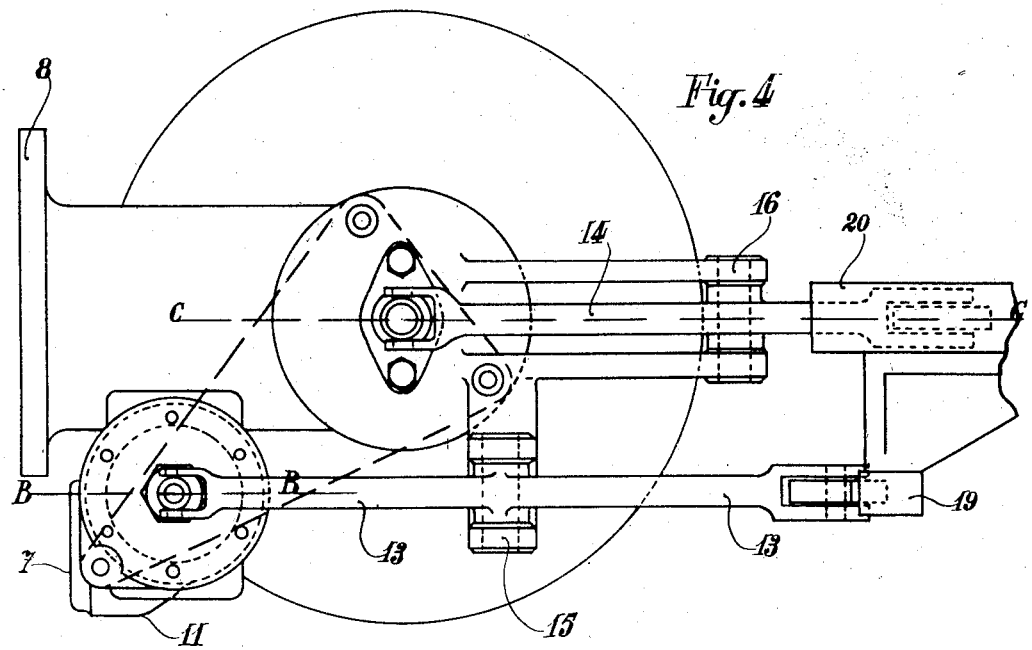
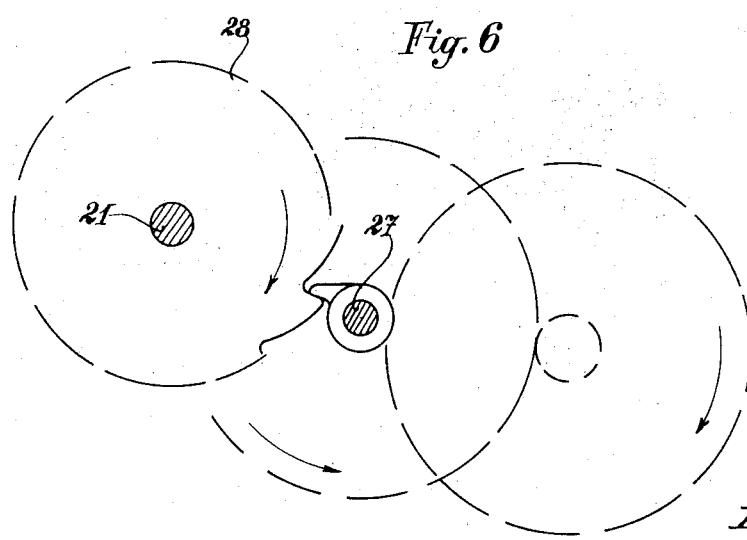
Inventor:
Jean Baptiste Vernay
By
Attorney.

March 13, 1928. 1,662,726
J. B. VERNAY
FILTERING APPARATUS
Filed Feb. 16 1927 4 Sheets-Sheet 4

Inventor:
Jean Baptiste Vernay
By
Attorney

Patented Mar. 13, 1928.

1,662,726

UNITED STATES PATENT OFFICE.

JEAN BAPTISTE VERNAY, OF VILLEURBANNE, FRANCE.

FILTERING APPARATUS.

Application filed February 16, 1927, Serial No. 168,736, and in France February 24, 1926.

This invention refers to a filtering apparatus which permits of removing clear liquid from a liquid containing solid matter in suspension, in order to make easier and quicker the work of the filter proper such as, for instance, a filtering drum.

The object of this invention is to improve the apparatus and to provide automatic means for continuous working.

In the annexed drawings:

Fig. 3 is a vertical section on line A—A (Fig. 2).

Fig. 4 is an enlarged plan view of the mechanism controlling the valves.

Fig. 6 is a schematic view of the driving gear of the mechanism.

Figure 1:
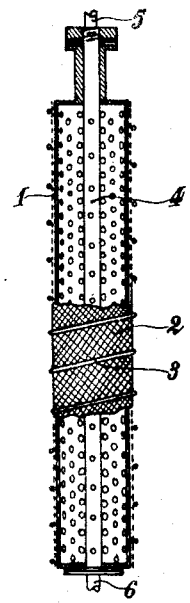
Fig. 1 is a view of a filtering cell with parts in vertical section.
Figure 2:
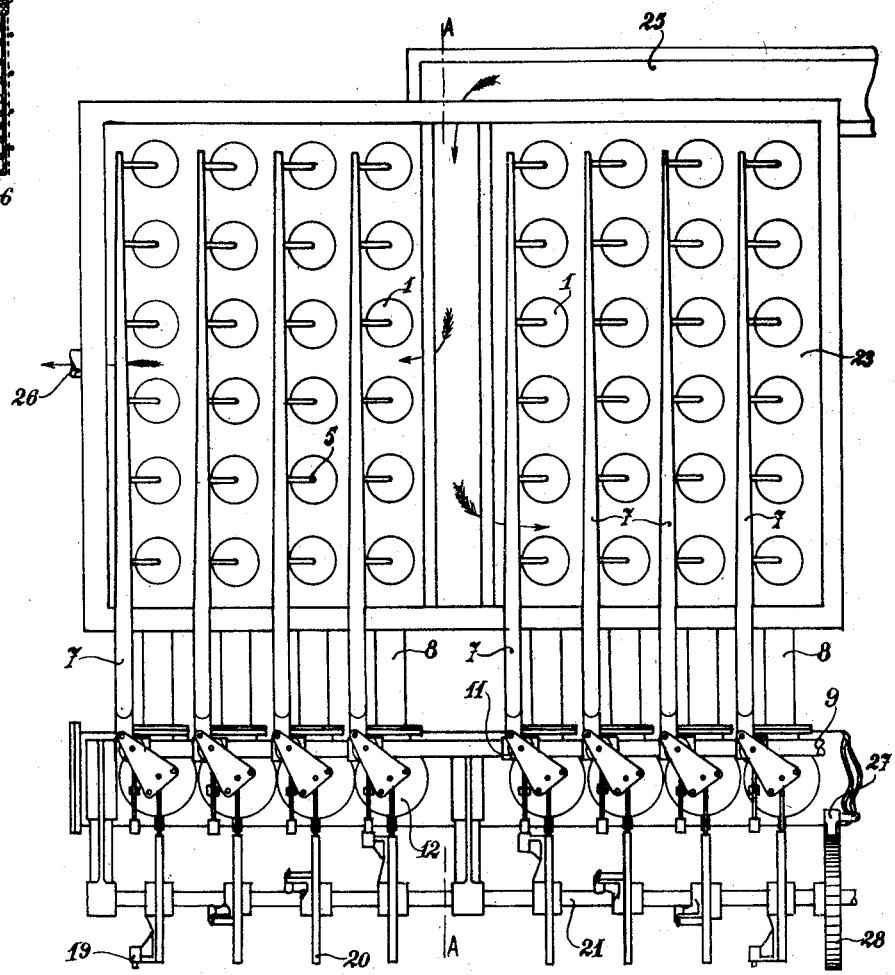
Fig. 2 is a plan view of an apparatus comprising forty-eight cells.
Figure 5:
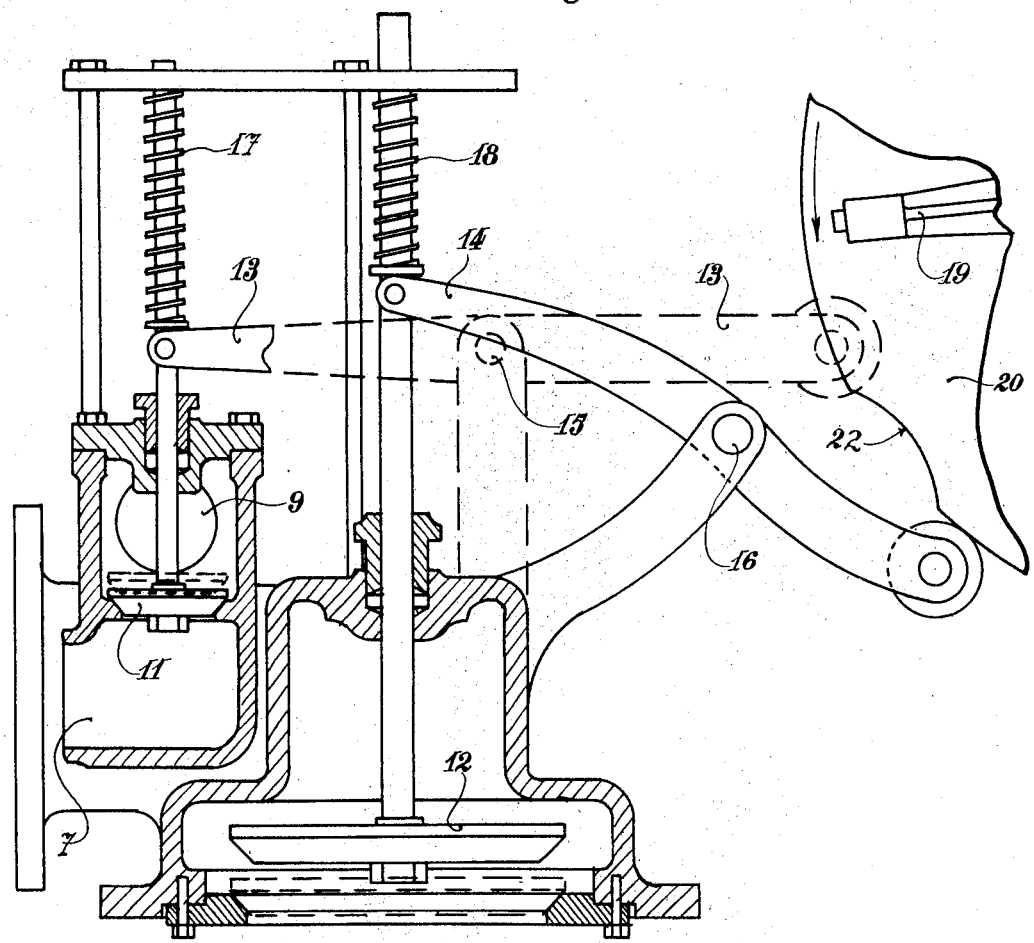
Fig. 5 is a vertical section on line B—B—C—C (Fig. 4).

The cell (Fig. 1) is a substantially cylindrical box 1 with a perforated side wall and closed ends. A filtering cloth 2 is wrapped around the perforated wall and maintained by a winding 3 of wires or the like.

A perforated tube 4 is driven through box 1 substantially along the axis of the same.

The cell is intended to be immersed in the liquid, the upper end 5 of tube 4 being connected to a compressed air piping, and the lower end 6 to the inlet of a pump or to any other low-pressure apparatus, suitable valves being inserted in said connections.

When the cell is connected to the pump, clear filtered liquid enters box 1 through the filtering cloth 2 and solid matter is deposited on the outer surface of cloth 2. When, on the contrary, the cell is connected to a compressed air piping, the layer of solid matter is removed from cloth 2 and falls on the bottom of the tank in which the cells are immersed..

The automatic machine or apparatus of Figs. 2 to 6 comprises a number of such cells (forty-eight in the example represented). These cells are arranged in eight sections, each comprising six cells which work simultaneously, the upper ends 5 of their inner tubes being connected to a tube 7, and the lower ends 6 with a tube 8. The tubes 7 and 8 of a section are respectively connected to a compresseid air pipe 9 and to a low-pressure pipe 10, through valves 11 and 12 (see Figs. 3, 4 and 5).

These valves 11 and 12 (Figs. 4 and 5) are automatically operated by levers 13 and 14, fulcrumed at 15 and 16, their closing being insured by springs 17 and 18. Levers 13 and 14 are controlled by cams 19 and 20 keyed on a shaft 21 (Figs. 2 and 3) which runs parallel to pipes 9 and 10. Cam 19 (which controls lever 13 and valve 11) is a sort of radial arm which acts on lever 13 for only a reduced angle of rotation. Cam 20, on the contrary, is a disk provided with a peripherical notch 22, and acts continuously on lever 14 except for a small angle. The cams are adjusted in such a manner that valve 11 opens when valve 12 closes and that valve 12 opens when 11 closes.

When shaft 21 is rotated, valve 12 being opened and valve 11 closed, the cells of the section are connected with the low pressure pipe 10 and clear liquid is removed from the tank 23 in which the cells are immersed. This operation lasts for the greatest part of a rotation of shaft 21. When cam 19 acts on lever 13, valve 11 is opened, but, as aforesaid, notch 22 simultaneously releases valve 12 which is closed by spring 17. The cells are then connected with the compressed air pipe 9 and the coating of matter which has been deposited on the cloth of the cells is driven away and falls on the bottom of tank 23.

As shown in Fig. 3, this bottom is V-shaped in section and a screw 24 arranged along its lower edge. Screw 24 is driven by any appropriate gearing (not shown).

The liquid to be treated enters the tank through trough or conduit 25. The outlet of said tank is represented at 26 and screw 24 acts to convey to the outlet 26 the mud-like matter which falls from the cells.

The continuous working is obtained by arranging the cams 19 and 20 of the different sections along shaft 21 in successive angular positions, the sections being connected successively (and not simultaneously) with the compressed air pipe 9.

The rotation of shaft 21 is preferably of a jerky character in order to avoid any simultaneous opening of valves 11 and 12. This is obtained Fig. 6) by imparting a step-by-step rotary movement to shaft 21 by means of a one-toothed gear 27 which acts on the successive teeth of a gear wheel 28 keyed on said shaft. The number of teeth of gear 28 is such that the successive stops of shaft 21 correspond (in angular positions) to the wide opening or closing of any of the valves 11 and 12 and never to an intermediate position of the same. In the example shown in the drawings, there are assumed to be sixteen teeth on gear 28 for eight sections of cells. Eight of the sixteen positions obtained correspond to the connection of a section with the compressed air pipe, whereas in the other eight positions the eight sections are disconnected from said pipe and connected with the low-pressure pipe 10.

The arrangement of the single inner tube 4 permits of using a reduced vacuum in pipe 10, as gravity helps the pump in removing liquid from tank 23.

Instead of compressed air, liquid under pressure or any other fluid might be employed for removing the coating of solid matter on cloth 2. The working would be the same.

What I claim is:

1. A filtering apparatus, comprising in combination a set of filtering cells of substantially cylindrical shape, each having an inner perforated tube extending therethrough from end to end; a tank wherein said cells are disposed, adapted to contain a diluted mixture of liquid and solid matter to be filtered; the upper ends of said tubes being connected to a source of fluid under pressure and their lower ends to a low-pressure line; valves in both connections; and means for automatically operating said valves in order to connect said cells alternately with the low-pressure line through the lower ends of their tubes and with the fluid under pressure through the upper ends of said tubes.

2. A filtering apparatus according to claim 2 in which the cells are distributed in sections; the upper and lower ends of the tubes of the cells of a section being respectively connected in parallel, whereby each section is controlled by two valves; said apparatus comprising means for operating the valves of the sections in successive order, whereby always at least one section is connected with the low-pressure line and the removal of filtered liquid from the mixture to be filtered is continuous.

3. A filtering apparatus comprising in combination a tank containing the mixture to be filtered; filtering cells immersed in said tank, each cell comprising a substantially cylindrical box having a perforated cylindrical wall with filtering cloth thereon, and an inner perforated tube extending through said box from end to end, said cells being distributed in sections, the upper and lower ends of the tubes of the cells of a section being connected in parallel respectively with a line of fluid under pressure and with a low-pressure line through valves; a lever for operating each valve; a cam for controlling each lever the cams controlling the valves of the line of fluid under pressure being in the form of radial arms, and the cams controlling the valves of the low-pressure line being in the form of notched disks; and means for rotating simultaneously all the cams, said means being arranged to avoid the simultaneous connection of a section with both the line of fluid under pressure and the low-pressure line, whereby a section is connected successively with the low-pressure line for a length of time and then with the line of fluid under pressure for a much shorter time.

4. A filtering apparauts according to claim 4 in which the cams are arranged in such a way that the sections are operated in successive order, whereby at least one section is always connected with the low-pressure line and the removal of liquid from the diluted mixture to be filtered is continuous.

5. A filtering apparatus comprising in combination a tank into which the mixture to be filtered is admitted; filtering cells immersed in the mixture in said tank, said cells being distributed in sections, the inlets and outlets of the cells of a section being respectively connected in parallel with a line of fluid under pressure and with a low-pressure line; valves in said connections; cams for operating said valves; and means for imparting a jerky rotary motion to all the cams simultaneously, the different stops of such motion corresponding to the complete closing or opening of any of said valves.

6. A filtering apparatus according to claim 6 in which the means for rotating the cams simultaneously are arranged in such a way that the sections are operated in successive order, whereby at least one section is always connected with the low-pressure line and the removal of filtered liquid from the diluted mixture to be filtered is continuous.

7. A filtering apparatus, comprising in combination a tank into which the mixture to be filtered is admitted; filtering cells immersed in the mixture in said tank, said cells being distributed in sections, the inlets and outlets of the cells of a section being respectively connected in parallel with a line of fluid under pressure and with a low-pressure line; valves in said connections; cams for operating said valves; a common shaft on which said cams are keyed; a gear wheel on said shaft; and a one-toothed driving pinion for said gear wheel for imparting to the same a jerking motion; said cams being angularly positioned on said shaft in such a way that the different sections are successively connected for a length of time with the low-pressure line and for a much shorter time with the line of fluid under pressure; the number of teeth of said gear wheel being such that the different successive stops of said common shaft correspond to the complete opening or closing of any of the valves.

In testimony whereof I affix my signature.

JEAN BAPTISTE VERNAY.